Jan. 12, 1926. 1,569,254
G. E. BISHOP
AUTOMOBILE INCLOSURE
Filed April 18, 1922
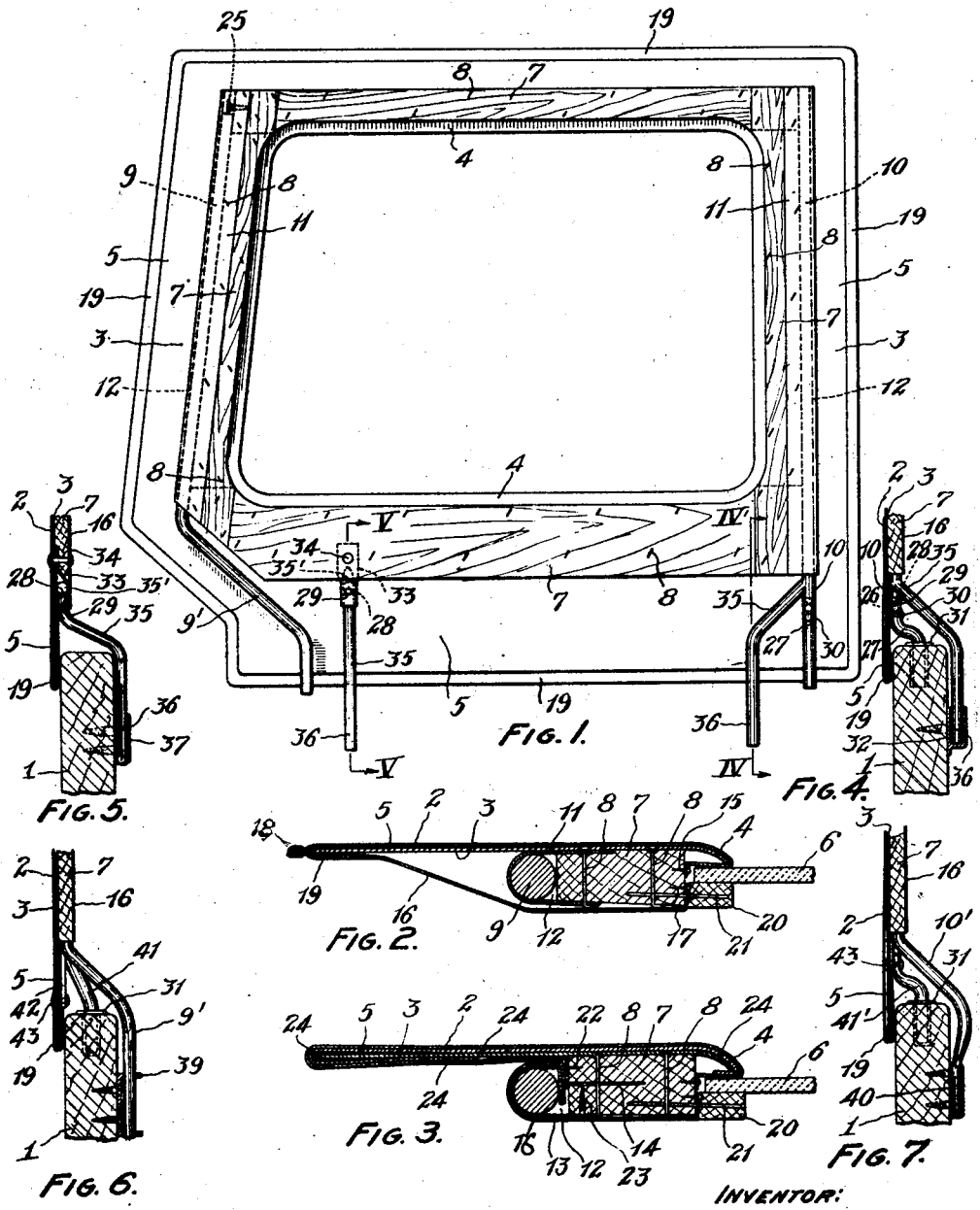
INVENTOR:
GEORGE E. BISHOP
BY George W. Saywell
ATTORNEY Patented Jan. 12, 1926.

1,569,254

UNITED STATES PATENT OFFICE.

GEORGE E. BISHOP, OF CLEVELAND, OHIO.

AUTOMOBILE INCLOSURE.

Application filed April 18, 1922. Serial No. 554,463.

*To all whom it may concern:*

Be it known that I, GEORGE E. BISHOP, a citizen of the United States, resident of Cleveland, county of Cuyahoga, and State of Ohio, have invented new and useful Improvements in Automobile Inclosures (Case U), of which the following is a specification, the principle of the invention being herein explained, and the best mode in which I have contemplated applying that principle so as to distinguish it from other inventions.

My invention relates to automobile inclosures, and particularly to the upper door-section of such inclosures. More particularly, the invention relates to a new and improved frame for an upper door section which is adapted to support a glass outlook.

The annexed drawing and the following description set forth in detail certain means embodying my invention, the disclosed means, however, constituting but one of the various mechanical forms in which the principle of the invention may be applied.

In said annexed drawing:

Figure 1 represents an inside view of one form of my improved frame, also disclosing, for purposes of illustration only, two forms of auxiliary supporting means adapted to relieve the upper supporting rod stops of a portion of the weight of the frame and to transfer this stress to the sheet iron comprising a part of the frame, as hereinafter fully described;

Figure 2 represents a horizontal section of the left-hand side of the frame shown in Figure 1, also showing the fabric and lining and a section of the glass outlook and a wood bead adapted to hold the outlook, in combination with a metal bead forming part of the sheet iron member;

Figure 3 represents a horizontal section, similar to Figure 2, of a form of enclosure which includes cotton sheeting forming a cushioning pad where the door inclosure edge laps the automobile side sections, as well as producing a soft effect to the outside of the door inclosure itself. This form of inclosure in Figure 3 also shows the application of the fabric to the inclosure section by stretching and tacking to a wood frame forming part of the inclosure; and also shows an arrangement of a metal channel section differing from the arrangement shown in Figure 2;

Figures 4 and 5 represent fragmentary vertical sections, taken in the planes indicated by the respective lines IV—IV and V—V, Figure 1, illustrating two forms of an auxiliary stress-carrying supporting member adapted partially to relieve the upper supporting rod stops of the weight of the inclosure. The forms of supporting means shown in Figures 4 and 5 consist of swivelly-connected members, so that they can be turned down flat for storage, as hereinafter fully explained.

Figures 6 and 7 represent fragmentary vertical sections of two other forms of auxiliary stress-carrying supporting members, these constructions showing integral sections which cannot be turned down flat for storage.

Referring to the annexed drawing, a vertical section of an automobile door is indicated by the ordinal 1, the same being omitted from Figure 1. Suitable automobile side inclosure fabric is indicated by the ordinal 2. This fabric 2 covers a frame built up in the manner hereinafter described to carry the glass outlook 6, the whole forming the upper door section of an automobile side inclosure. This frame consists of galvanized sheet iron sections 3, preferably 24 gauge B. & S. standard, having an interior bead 4 forming a rest for one face of the outlook 6 and having an exterior extension 5 adapted to lap the automobile side sections. This sheet iron section 3 is secured to a wood frame 7 by means of wire nails 8, as plainly shown in Figures 2 and 3. A metal section 11 is also secured to the wood frame 7, adjacent the outer edge thereof, by means of the nails 8, so as to form a channel 12 which receives supporting rods 9 and 10, as plainly shown in Figures 1 and 2. Figure 3 discloses a somewhat different arrangement of the metal member forming the channel 12, the same therein being indicated by the ordinal 13 and being secured to the outer edge of the frame member 7 by means of the nail 14 and to the inner face of said frame member 7 by the screw 23. The fabric 2, Figure 2, is secured to the inner edge of the frame member 7 by means of the tack 15, is pasted to the sheet metal section 3, and is secured to an inner lining 16 by means of binding 18, as plainly shown in said Figure 2, the inner edge of the lining 16 being secured to the inner edge of the frame member 7 by means of the tack 17. Adhesive tape, or, if preferred, a folded back metal section, is indicated by the ordinal 19 and covers the outer lapping edge of the extension 5 of the metal section 3. In order to hold the glass outlook 6 to the metal bead 4 I utilize an inner wood bead 20 secured to the inner edge of the frame member 7 by means of the wire nail 21. Referring to Figure 3, the fabric 2 is applied to the inclosure by stretching the same and by tacking the inner edge thereof to the outer edge of the frame member 7, as indicated by the ordinal 22. Also, in Figure 3, I disclose cotton sheeting 24 which gives a soft effect to the outside of the inclosure as well as a cushion effect to the outer edge which laps the automobile side sections. In Figure 3, also, it will be noted that the outer edge of the lining section 16 is secured to the outer edge of the frame member 7 by means of said nail 14.

Adjacent the tops of the supporting rods 9 and 10 screws 25 are secured to the wood section 7, these screws 25 forming stops which support the frame on the rods 9 and 10. In order to relieve these screws 25 of a part of the weight of the inclosure, or to dispense with these stops 25 entirely, I provide several forms of auxiliary stress-carrying supporting sections which transfer part of this weight to the sheet iron sections 3. For the purposes of illustration only, and not because I contemplate using two forms of these auxiliary sections in the same curtain, I show two forms of these sections in Figure 1. Side elevations of these sections are also shown in Figures 4 and 5. Upon the right side of Figure 1 I have dispensed with the stop 25 and allowed the top of the rod 10 to abut the fabric 2.

Referring particularly to the right-hand side of Figure 1, and also to Figure 4, the supporting rod 10 which is mounted in the bushing 31 is substantially straight except for a slight offset 27 necessary to bring the same in line with the top of the automobile door 1. This rod 10 is secured to the lower section 5 of the sheet iron member 3 by means of a rivet 30. An auxiliary stress-carrying member 35 is integrally secured to the rod 10 and is so offset as to be accommodated by its lower end portion 36 in the bracket 32 secured to the inner face of the door 1. The section of the rod 10 adjacently below the junction of the same with the auxiliary member 35 is indicated by the ordinal 26 and the same is of reduced cross-sectional area, and formed with a groove 28 which accommodates a bead 29 formed upon the offset portion 27 of the rod 10. The rivet 30 is disposed below the swivelling members 28 and 29 so that it is evident when the inclosure is lifted from the door, the body portion of the supporting rod 10 and the member 35, which are integrally united, can be turned so as to bring the offset member 35 into substantially the plane of the sheet metal section 5, whereby the inclosure can be stored substantially flat.

Referring particularly to the left-hand side of Figure 1, and also to Figure 5, the supporting rod 9 is provided with an offset 9' so that it may be received by a bushing disposed in the upper edge of the door, similar to the bushing 31 shown in Figure 4, but the auxiliary stress-carrying section 35, in this form, is secured to a section of the lower sheet metal member 3 somewhat remote from the rod 9. In this form, a tip section 33 is secured by a rivet 34 to the lower sheet metal section 3 and is formed with an inner bead 29 adapted to co-operate with a groove 28 formed in an upper end section 35' formed on the member 35, similar to the construction of the member 26 shown in Figure 4. The section 35 is supported by a bottom section 36 in a bracket 37 secured to the inner face of the door 1.

Referring particularly to Figures 6 and 7, there are therein disclosed forms of auxiliary stress-carrying sections 41 and 41' which are seated in bushings 31 secured in the top edge of the door 1, whereas the offset sections 9' and 10' of the rods 9 and 10 are secured in brackets 39 and 40, respectively, secured to the inner faces of the door 1. In the one case, Figure 6, a vertical extension 42 formed as an integral part of the member 41' is secured to the sheet metal section 5 by means of a rivet 43 and the auxiliary section 41' consists of a curved member extending from the rod 9 to the bushing 31, as plainly shown; and, in the other case, Figure 7, the auxiliary section 41' is directly secured to the sheet metal member 5 by the rivet 43 and is formed with an offset adapted to register with the bushing 31, as plainly shown. In these forms, Figures 6 and 7, the construction does not allow for turning down flat for storage purposes.

I wish to direct particular attention to the construction whereby the supporting members are riveted to the lower sheet metal member 5, the same comprising an attachment which is secured to the sections of the rods 9 and 10 which are incorporated in the inclosure, said attachment being riveted to the lower sheet metal section 5 and having one or more supporting sections which are adapted to be received by suitable door sockets.

What I claim is:

1. In automobile inclosures, the combination for an upper door-section, of a glass outlook; a wooden frame bounding said outlook; sheet metal strengthening members secured to said frame and extending exteriorly thereof and forming a lapping edge, said sheet metal members also extending interiorly of said frame to form a rest for the outside of said outlook; a bead secured interiorly of said frame and adjacent the inner face thereof for retaining said outlook; rods adapted removably to mount the inclosure upon the automobile door; and suitable fabric covering said frame and sheet metal members.

2. In automobile inclosures, the combination for an upper door-section, of a glass outlook; a wooden frame bounding said outlook; sheet metal strengthening members secured to said frame and extending exteriorly thereof and forming a lapping edge; spaced means secured interiorly of said frame adjacent the inner and outer faces thereof and forming rests for said outlook; sheet metal sections secured to said frame adjacent the outer edges thereof and forming channels adjacent said edges; rods, adapted removably to mount the inclosure upon the automobile door, incorporated within said channels; and suitable fabric covering said frame and sheet metal members and sections.

3. In automobile inclosure, the combination for an upper door-section of a glass outlook; a wooden frame bounding said outlook; sheet metal strengthening members secured to said frame and extending exteriorly thereof and forming a lapping edge, said sheet metal members also extending interiorly of said frame to form a rest for the outside of said outlook; a bead secured interiorly of said frame and adjacent the inner face thereof for retaining said outlook; rods adapted removably to mount the inclosure upon the automobile door; suitable fabric covering said frame and sheet metal members; and a cushioning pad bounding said sheet metal members and disposed within said fabric.

4. In automobile inclosures, the combination for an upper door-section, of a glass outlook; a wooden frame bounding said outlook; sheet metal strengthening members secured to said frame; spaced means secured interiorly of said frame adjacent the inner and outer faces thereof and forming rests for said outlook; one-piece rods adapted removably to mount the inclosure upon the automobile door; stops secured to said frame, and providing means by which said frame is supported upon said rods; suitable fabric covering said frame and sheet metal members; and auxiliary stress-carrying supporting members secured to the lower sheet metal member and having supporting sections adapted to be seated in door sockets.

5. In automobile inclosures, the combination for an upper door-section, of a glass outlook; a wooden frame bounding said outlook; sheet metal strengthening members secured to said frame; spaced means secured interiorly of said frame adjacent the inner and outer faces thereof and forming rests for said outlook; rods adapted removably to mount the inclosure upon the automobile door; stops secured to said frame, and providing means by which said frame is supported upon said rods; suitable fabric covering said frame and sheet metal members; and auxiliary stress-carrying rod sections secured to the lower sheet metal member and having lower swivel portions adapted for attachment to the automobile door.

6. In automobile inclosures, the combination for an upper door-section, of a glass outlook; a wooden frame bounding said outlook; sheet metal strengthening members secured to said frame; spaced means secured interiorly of said frame adjacent the inner and outer faces thereof and forming rests for said outlook; rods adapted removably to mount the inclosure upon the automobile door; screws secured to said frame, and providing means by which said frame is supported upon said rods; suitable fabric covering said frame and sheet metal members; and auxiliary stress-carrying supporting members secured to said rods and adapted for attachment to the automobile door, said rod-and-stress-carrying-member combination being secured to the lower sheet metal member.

7. In automobile inclosures, the combination for an upper door-section, of a glass outlook; a wooden frame bounding said outlook; sheet metal strengthening members secured to said frame; spaced means secured interiorly of said frame adjacent the inner and outer faces thereof and forming rests for said outlook; one-piece rods adapted removably to mount the inclosure upon the automobile door; suitable fabric covering said frame and sheet metal members; and auxiliary stress-carrying supporting members secured to the lower sheet metal member and having supporting sections adapted to be seated in door sockets.

8. In automobile inclosures, the combination for an upper door section, of an outlook; a wooden frame bounding said outlook; sheet metal strengthening members secured to said frame; spaced means secured interiorly of said frame adjacent the inner and outer faces thereof and forming rests for said outlook; one-piece rods incorporated within the inclosure; suitable fabric covering said frame and sheet metal members; and attachment members secured to the rods and integrally secured to the lower sheet metal members and having supporting sections adapted to be seated in door sockets.

9. In automobile inclosures, the combination for an upper door section, of an outlook; a wooden frame bounding said outlook; sheet metal strengthening members secured to said frame; spaced means secured interiorly of said frame adjacent the inner and outer faces thereof and forming rests for said outlook; one-piece rods adapted removably to mount the inclosure upon the automobile door; suitable fabric covering said frame and sheet metal members; and stress-carrying attachment members integrally secured to the lower sheet metal member and having supporting sections adapted to be seated in door sockets.

10. In automobile inclosures, the combination for an upper door section, of an outlook; a wooden frame bounding said outlook; sheet metal strengthening members secured to said frame; spaced means secured interiorly of said frame adjacent the inner and outer faces thereof and forming rests for said outlook; one piece rods incorporated within the inclosure; suitable fabric covering said frame and sheet metal members; and stress-carrying attachment members secured to said rods riveted to the lower sheet metal member and having each a pair of supporting sections adapted to be seated in door sockets.

Signed by me this 8th day of April, 1922.

GEORGE E. BISHOP.